(12) United States Patent
Brindöpke et al.

(10) Patent No.: US 7,262,261 B2
(45) Date of Patent: Aug. 28, 2007

(54) BINDERS AND A METHOD OF USE THEREOF AS COATING MATERIAL FOR METAL CONTAINERS

(75) Inventors: Gerhard Brindöpke, Sulzbach (DE); Oliver Etz, Huenstetten (DE); Paul Oberressl, Wiesbaden (DE); Bodo Wixmerten, Buettelborn (DE)

(73) Assignee: Surface Specialities Germany GmbH & Co. KG (DE)

( * ) Notice: Subject to any disclaimer, the term of this patent is extended or adjusted under 35 U.S.C. 154(b) by 477 days.

(21) Appl. No.: 10/702,671

(22) Filed: Nov. 6, 2003

(65) Prior Publication Data
US 2004/0092674 A1  May 13, 2004

(30) Foreign Application Priority Data
Nov. 11, 2002  (DE) .................. 102 52 627

(51) Int. Cl.
C08G 14/12  (2006.01)
C08G 59/14  (2006.01)

(52) U.S. Cl. .................. 528/107; 525/57; 525/58; 525/108; 525/109; 525/131; 525/176; 525/438; 525/454; 525/523

(58) Field of Classification Search ............. None
See application file for complete search history.

(56) References Cited

U.S. PATENT DOCUMENTS 4,859,788 A  8/1989  Brindopke et al. ........ 558/398
4,886,845 A  12/1989  Becker et al. ............ 523/403

FOREIGN PATENT DOCUMENTS

| EP | 0 272 595 | | 6/1988 |
|---|---|---|---|
| EP | 0 286 933 | | 10/1988 |
| GB | 949713 | * | 2/1964 |
| JP | 56-100823 A | * | 8/1981 |
| JP | 63-150317 A | * | 6/1988 |
| JP | 10-120760 A | * | 5/1998 |

OTHER PUBLICATIONS

Paquin, A.M., Epoxydverbindungen und Epozydharze, Chapter 4, Berlin, Springer-Verlag, 1958, pp. 256-307. [In German].
Lee & Neville, Handbook of Epoxy Resins, Chapter 2, "Synthesis of Glycidyl-Type Epoxy Resins," New York, McGraw-Hill, 1967, pp. 2-1 to 2-33.
Elvers, B. et al., Ullmann's Encyclopedia of Industrial Chemistry, 5th Ed., vol. A 18, "Paints and Coatings," 1991, p. 418.
DATABASE WPI, Section Ch, Week 198244, Derwent Publications Ltd., London, GB; Class A21, AN 1982-93757E, XP002271120 & JP 57 155226A (Matsushita Electric Works Ltd.) Sep. 25, 1982.
DATABASE WPI, Section Ch, Week 198831, Derwent Publications Ltd., London, GB; Class A21, AN 1988-215541, XP002271121 & Jp 63 150317A (Kansai Paint Co. Ltd.) Jun. 23, 1988.
Saito, N. et al., "Resol-type phenolic resins free of low molecular weight components and their compositions for solvent-type water-thinned coatings" XP002271108, May 12, 1998.

* cited by examiner

Primary Examiner—Robert Sellers
(74) Attorney, Agent, or Firm—Connolly Bove Lodge & Hutz LLP

(57) ABSTRACT

Condensation products of dihydroxyaromatics A, alone or in mixture with mono- or polyhydroxyaromatics C, with diepoxides or polyepoxides B which have been alkylolated by reaction with aldehydes D and whose alkylol groups may have been etherified with alcohols, a process for preparing them, and a method of use thereof in particular as compositions for coating the inside of foodstuff and beverage packaging forms made from metals.

3 Claims, No Drawings

BINDERS AND A METHOD OF USE THEREOF AS COATING MATERIAL FOR METAL CONTAINERS

FIELD OF THE INVENTION

The invention relates to binders, their preparation and use in particular in the field of the interior coating of metal packaging forms.

BACKGROUND OF THE INVENTION

It is known that phenolic resins are virtually impossible to surpass by other synthetic resins in chemical resistance, in water and solvent resistance, and in corrosion resistance (Ullmann's Encyclopedia of Industrial Chemistry, Paints and Coatings, vol. A18, (1991), p. 418). Particularly in the field of interior protective coating materials for coating metal packaging forms made from tinplate, aluminum, and sheet steel, heat-curable phenolic resins have proved to be outstanding.

The prime function of interior coatings on containers intended for use for keeping beverages and foodstuffs is to protect the packaging against corrosion by the contents and, conversely, to preserve the contents against the effect of metal ions and the associated taste impairment.

Very largely pore-free film formation, sufficient hardness, flexibility, and scratch resistance, and also firm adhesion and sterilization resistance are further important properties vital to interior protective coatings.

In addition, the composition of the coating material is subject to the statutory regulatory provisions of the Bundesgesundheitsamt in Germany and to approval in the USA by the FDA (21 CFR § 175.300—regulation).

In order to comply with the profile of requirements of an interior coating, however, phenolic resins cannot be used as sole binders. To date the phenolic resins have been used only in the presence of elasticizing resins, particularly epoxy resins.

From the literature it is known that phenolic resins are plasticized or flexibilized using relatively high molecular mass epoxy resins of type 7 or 9. These types of epoxy resin exhibit not only good adhesion to steel, tinplate, aluminum, and other common container materials but also good resistance to dilute acids (e.g., acetic acid, lactic acid, and carbonic acid) and sulfur. They are additionally stable to pasteurization and to sterilization. The type 7 or 9 epoxy resins used, however, include mass fractions of up to 5% each of BADGE (bisphenol A diglycidyl ether) and free bisphenol A. These two compounds, however, are not unobjectionable from the standpoint of health. Furthermore, for sufficient curing, leading to the sufficient resistance to solvents, for example, that is required for the coating film, these coating systems require high baking temperatures and long cure times. Accordingly, more reactive binder systems are desirable for the user.

The object is therefore to provide binders for metal container coating which can be used inter alia as sole binders and which do not have the above disadvantages, or at least only to a reduced extent.

SUMMARY OF THE INVENTION

Surprisingly it has been found that these advantageous properties are possessed by condensation products of dihydroxyaromatics with diepoxides or polyepoxides, where appropriate with additional use of mono- or polyhydroxyaromatics, said products having been alkylolated by reaction with aldehydes and/or being alkylolated and etherified. These binders can be used as sole binders, but can also be combined and cured together with further, customary binders.

The invention accordingly provides condensation products of dihydroxyaromatics A, in a mixture if desired with mono- or polyhydroxyaromatics C, with diepoxides or polyepoxides B, said products having if desired been etherified with alcohols E and being alkylolated, preferably methylolated, by reaction with aldehydes D.

DETAILED DESCRIPTION OF THE PREFERRED EMBODIMENTS

The mono- and polyhydroxyaromatics C that are suitable for the present invention are selected from the monovalent monocyclic and polycyclic phenols C1 and aromatic compounds C3 having more than two hydroxyl groups, each of which is attached to an aromatic carbon atom, and from the alkylidenepolyphenol resoles or novolaks Cx having more than two free phenolic hydroxyl groups.

Suitable dihydroxyaromatics A are monocyclic and polycyclic aromatic compounds having two hydroxyl groups, such as pyrocatechol, hydroquinone, resorcinol, the isomeric dihydroxynaphthalenes, especially the 1,8, 2,3, and 2,6 isomers, dihydroxybiphenyl, dihydroxydiphenyl ether, dihydroxydiphenyl sulfone, and dihydroxybenzophenone. Likewise suitable are alkylidenebisphenols A1 such as bisphenol A, bisphenol F or resoles or novolaks A11 (alkylidenepolyphenol resoles or alkylidenepolyphenol novolaks) having two free phenolic OH groups. Alkylidenepolyphenol resoles or novolaks which can be used include all polyphenols whose skeleton has been prepared from phenolic substances and oxo compounds.

Examples of suitable trivalent phenols C3 are pyrogallol, hydoxyhydroquinone, and trisphenol TC ($\alpha$, $\alpha'$, $\alpha''$-tris(4-hydroxyphenyl)-1,3,5-triisopropylbenzene), with the group C3 also including phenolic compounds having more than three hydroxyl groups, such as apionol (1,2,3,4-tetrahydroxybenzene) and 1,2,4,5-tetrahydroxybenzene.

The alkylidenepolyphenol resoles or novolaks Cx are prepared by (co)condensation of monovalent, unsubstituted or alkyl-substituted phenols C1 and/or polyvalent phenols C3 or mixtures thereof with aldehydes D having generally 1 to 12, preferably 1 to 9, and in particular 1 or 2 carbon atoms in the presence of acidic or basic catalysts. Examples of the monovalent phenols C1 include phenol, o-, m-, and p-cresol, 3,5-dimethylphenol, 1,3,4-xylenol, p-phenylphenol, and alkylphenols, such a p-tert-butylphenol, octylphenol, and nonylphenol. Of the aldehydes D it is preferred to use formaldehyde. Also suitable are acetaldehyde, propionaldehyde, butyraldehyde, isobutyraldehyde, valeraldehyde, hexyl, heptyl, octyl, nonyl, and decyl aldehyde and their isomers.

The alkylidenepolyphenol resoles or novolaks Cx employed have number-average molar masses $M_n$ of from 250 to 1 500 g/mol and average degrees of condensation of greater than 2 up to 10.

As component A it is possible to use both the individual compounds and also mixtures.

It is likewise possible in accordance with the invention first to perform the reaction of the compounds A and B and then to mix in alkylidenepolyphenol resoles or novolaks Cx before the reaction with the aldehyde D is conducted. In this case the ratio of the mass of alkylidenepolyphenol resoles or novolaks Cx to the sum of the masses of Cx and the component A used initially is from 5 to 40%, preferably from 10 to 30%.

It is further in accordance with the invention to use monophenols C1 and/or polyhydroxyaromatics C3 in a mixture with the dihydroxyaromatics A in which case the mass fraction of the monophenols C1 and/or of the polyhydroxyaromatics C3 is from 3% to 30%, preferably from 5% to 20%, and in particular from 5 to 15% of the sum of the masses of the phenolic compounds.

Suitable diepoxy or polyepoxy resins B include a multiplicity of the compounds known for this purpose and contain on average more than one epoxide group, preferably two epoxide groups, per molecule. These epoxide compounds B (epoxy resins) can be either saturated or unsaturated, can be aliphatic, cycloaliphatic, aromatic or heterocyclic, and can also contain hydroxyl groups. They may further contain substituents which do not give rise to any disruptive side reactions under the conditions of mixing or of reaction, examples being alkyl and aryl substituents, ether groups, and the like. Preferably they are glycidyl ethers of polyvalent phenols or polyhydric alcohols whose specific epoxide group contents are from 0.5 to 6.7 mol/kg, preferably from 1.00 to 5.5 mol/kg ("epoxide equivalent weights" of between 150 and 2 000, but in particular between 180 and 1 000 g/mol).

The specific epoxide group content is defined as the ratio of the amount of substance of epoxide groups n(EP) to the mass $m_B$ of the substance (and is therefore the reciprocal of the "EV" value or "epoxide equivalent weight" (EEW)); the customary unit is "mol/kg".

As component B it is also possible to use polyglycidyl ethers of polyalcohols, such as ethylene glycol 1,2-diglycidyl ether, propane-1,2-diol diglycidyl ether, propane-1,3-diol diglycidyl ether, butane-1,4-diol diglycidyl ether, pentane-1,5-diol diglycidyl ether, neopentylglycol diglycidyl ether, hexane-1,6-diol diglycidyl ether, diethylene glycol diglycidyl ether, dipropylene glycol diglycidyl ether, higher polyoxyalkylene glycol diglycidyl ethers, such as higher polyoxyethylene glycol diglycidyl ethers and polyoxypropylene glycol diglycidyl ethers, mixed polyoxyethylene-propylene glycol diglycidyl ethers, polyoxytetramethylene glycol diglycidyl ether, polyglycidyl ethers of glycerol, of trimethylolpropane, of trimethylolethane, of pentaerythritol, and of sorbitol, polyglycidyl ethers of oxalkylated polyols (such as, for example, of glycerol, trimethylolpropane, pentaerythritol, etc. each of them oxalkylated), diglycidyl ethers of cyclohexanedimethanol, of bis(4-hydroxycyclohexyl) methane and of 2,2-bis(4-hydroxycyclohexyl)propane, polyglycidyl ethers of castor oil, and triglycidyl tris(2hydroxyethyl)isocyanurate. Preference is given to using polyoxypropylene glycol diglycidyl ethers having a specific epoxide group content of from 1.25 to 6.67 mol/kg, in particular from 2.5 to 3.33 mol/kg ("epoxide equivalent weight" of from 150 to 800, in particular from 300 to 400 g/mol).

In addition to the polyglycidyl ethers B, in particular cases, it is possible to use small amounts of reactive diluents (monoepoxide compounds) B1, such as methyl glycidyl ether, butyl glycidyl ether, allyl glycidyl ether, ethylhexyl glycidyl ether, long-chain aliphatic glycidyl ethers, such as cetyl glycidyl ether and stearyl glycidyl ether, monoglycidyl ethers of higher isomeric alcohol mixtures, glycidyl ethers of a mixture of $C_{12}$ to $C_{13}$ alcohols, phenyl glycidyl ether, cresyl glycidyl ether, p-tert-butylphenyl glycidyl ether, p-octylphenyl glycidyl ether, p-phenylphenyl glycidyl ether or glycidyl ethers of an oxalkylated lauryl alcohol, for example, in mass fractions of up to 30%, preferably from 10 to 20%, based on the mass of the polyglycidyl ethers.

Also suitable, as component B, are poly(N-glycidyl) compounds, which are obtainable by dehydrohalogenating the reaction products of epichlorohydrin and amines such as aniline, n-butylamine, bis(4-aminophenyl)methane, m-xylylenediamine or bis(4-methylaminophenyl)methane. The poly(N-glycidyl) compounds also include, triglycidyl isocyanurate, N,N'-diglycidyl derivatives of cycloalkyleneureas, and diglycidyl derivatives of hydantoin, et cetera.

As component B it is also possible to use polyglycidyl ethers of polycarboxylic acids, which are obtained by reacting epichlorohydrin or similar epoxide compounds with an aliphatic, cycloaliphatic or aromatic polycarboxylic acid, such as oxalic acid, succinic acid, adipic acid, glutaric acid, phthalic acid, terephthalic acid, tetrahydrophthalic acid, hexahydrophthalic acid, 2,6-naphthalenedicarboxylic acid, and with polybasic organic acids such as, for example, dimerized or trimerized linolenic acid. Examples are diglycidyl adipate, diglycidyl phthalate, and diglycidyl hexahydrophthalate. In some cases it may also be advantageous to use copolymers containing glycidyl ester groups as an epoxide component, these being obtained by copolymerizing, for example, glycidyl (meth)acrylate with other (meth) acrylic esters or by copolymerization with styrene. An extensive list of suitable epoxide compounds can be found in the handbook "Epoxidverbindungen und Epoxidharze" by A. M. Paquin, Springer Verlag, Berlin 1958, chapter IV, and in Lee & Neville's "Handbook of Epoxy Resins", 1967, chapter 2. Further suitable resins are specified, for example, in the documents EP-A 272 595 and 0 286 933. Mixtures of two or more epoxy resins B can also be used.

To prepare the binders of the invention the dihydroxyaromatics A are reacted in the first step with the diepoxides or polyepoxides B in the presence of a catalyst and in such a way that the ratio of the amount of substance of phenolic OH groups in A to that of the epoxide groups in B is greater than 1 mol/mol. In this reaction it is also possible if desired to use monophenols C1, as specified, for example, for the preparation of the alkylidenepolyphenols, and/or polyhydroxyaromatics C3 and/or Cx. In this case as well the ratio of the sums of the amounts of substance of phenolic OH groups in A and C to the amount of substance of the epoxide groups in B is always greater than 1.

Catalysts for this reaction are sufficiently well known from the field of epoxy resin preparation; examples that may be mentioned here include the following: alkali metal and alkaline earth metal hydroxides, alkoxides, and phenoxides, tertiary amines such as dimethylaminoethanol, dimethylbenzylamine or tributylamine, phosphonium or ammonium salts, and phosphines.

The resulting condensation products of the first step, which carry free phenolic groups, are reacted in a second step with aldehydes D containing generally from 1 to 12, preferably from 1 to 9, and in particular 1 or 2 carbon atoms, in the presence of catalysts and in such a way that the reaction product formed preferably contains free alkylol groups, preferably methylol groups, or alkylene ether groups, preferably methylene ether groups, and possibly also alkylene groups, preferably methylene groups. The aldehydes D can be the same as or different from those referred to above under D. In the course of this reaction it is possible in turn to add alkylidenebisphenols A1, resoles or novolaks A11 and/or alkylidenepolyphenol resoles or novolaks Cx.

Among the aldehydes D it is preferred to use formaldehyde. Besides formaldehyde, also acetaldehyde, propionaldehyde, butyraldehyde, isobutyraldehyde, valeraldehyde, hexyl, heptyl, octyl, nonyl, and decyl aldehyde, and their isomers can be used. The ratio of the amount of substance of aldehyde D to the sum of the amounts of substance of the terminal phenolic OH groups in the condensation products of the first step is greater than 1 mol/mol, preferably from 1 to 3 mol/mol, and in particular from 1 to 2.5 mol/mol.

As catalysts here it is preferred to use alkali metal or alkaline earth metal hydroxides or carbonates, ammonia or amines such as hexamethylenetetramine or dimethylaminoethanol. Also suitable for use, however, are all of the resole formation catalysts known from phenolic resin chemistry.

The resulting alkylolated product of the second step can be used as it is (sole binder); alternatively it can be reacted in a further, third step with alcohols E to yield binders in the form of alkylol ethers, preferably methylol ethers. Examples of suitable alcohols E include ethanol, n- and isopropanol, n- and isobutanol, and also the isomeric pentanols and hexanols, butyl glycol, and, in particular, methanol.

The binders of the invention are used with advantage in plasticized or elasticized form in a mixture with a plasticizing substance selected from the group consisting of epoxy resins, polyvinyl acetals, polyvinyl alcohols, alkyd resins, polyesters, fatty oils, polyurethanes, and rubbers, especially acrylonitrile rubber, or customary plasticizing substances of this kind. Elasticization with epoxy resins is of course only employed when absence of epoxy compounds is not a factor.

Suitable plasticizing or elasticizing epoxy resins include a multiplicity of the compounds known for this purpose which contain on average more than one epoxide group, preferably two epoxide groups, per molecule. A selection of these compounds has already been mentioned in connection with the preparation of the binders of the invention.

Examples of suitable polyvinyl acetals include polyvinyl butyral, polyvinyl propional and the like.

Examples of suitable fatty oils and/or their fats include linseed oil, linseed oil fatty acid, soybean oil, soybean oil fatty acid, sunflower oil, cashew nut shell oil, and the like.

Examples of suitable alkyd resins and polyesters include those based on phthalic acid, maleic acid, isophthalic acid, terephthalic acid, and trimellitic acid, and also on naturally occurring oils or fats, such as those mentioned above, and also on the corresponding fatty acids and their esters, particularly the glyceryl esters of these acids.

As the alcohol component of the alkyd resins and polyesters use is made in particular of dihydric alcohols such as ethylene glycol, propane-1,2-diol or -1,3-diol, the various butane diols, oxalkylation products of 4,4'-dihydroxydiphenylpropane, dimethylolcyclohexane, trihydric alcohols such as glycerol, trimethylolethane or trimethylolpropane, and higher polyhydric alcohols such as pentaerythritol.

Mixtures of said additions can also be used, e.g., epoxy resins and polyester resins. It is also possible to combine the phenolic resins of the invention in the form of precondensates with these elastacizing or plasticizing additions. Particularly advantageous in this context is the combination with epoxy resin.

The mass ratio of the plasticizing and elasticizing substances to the binders of the invention is generally from 1:99 to 50:50, preferably from 1:99 to 30:70.

Examples that may be mentioned of customary additives which may be present in the mixture according to the invention include the customary coating additives, such as pigments, pigment pastes, antioxidants, leveling agents, thickeners, defoamers and/or wetting agents, reactive diluents, fillers, curing catalysts, curatives, and further curable resins. These additives may where appropriate not be added to the curable mixture until immediately prior to processing. In order to accelerate the crosslinking reaction it is possible to use catalysts, especially acids, such as phosphoric acid, for example.

The curable binders according to the invention are particularly suitable for the interior coating of food or drink cans, and in view of the absence of bisphenol A and BADGE therein are to be classified as safe for food use according to the present-day situation. Furthermore, physiologically objectionable substances such as phenol and formaldehyde are released only in traces (less than 0.1% of the mass of the binder or of the binder mixture), if at all, in the course of crosslinking.

Additionally, the binders of the invention can also be used to produce coatings for other fields of use, such as for improving the adhesion of fibers, for example, to rubber and as impregnating compositions for porous or fibrous substrates.

Application to the substrate, such as metal, wood, glass, concrete, plastic, ceramic, etc., takes place in accordance with conventional methods, such as knife coating, brushing, spraying, dipping or rolling. The coatings are cured by heating at from 100 to 260° C. for a time sufficient for curing, generally from about 5 minutes to about 30 minutes.

The invention is explained in more detail in the examples below. In these examples "parts" are always parts by mass. Figures in "%" are always mass fractions (cg/g or g/(100 g)), and concentration figures in "%" are the ratio of the mass of the dissolved substance, based on the mass of the solution or of the mixture.

EXAMPLES

I Preparation of the Binders

1 Preparation of Binder 1

215 parts of diglycidyl ether of bisphenol A (specific epoxide group content 5.26 mol/kg; "epoxide equivalent weight" 190 g/mol) and 168 parts of bisphenol A were dissolved in 100 parts of xylene and the solution was heated to 130° C. Following the addition of 0.5 part of triphenylphosphine it was stirred until the specific epoxide group content was less than 0.1 mol/kg (epoxide equivalent weight more than 10 000 g/mol). The solution was then diluted with 100 parts of butanol and admixed with 22 parts of aqueous sodium hydroxide solution (33% strength). Then at 70° C. 55 parts of aqueous formaldehyde solution (37% strength) were added and stirring was continued for 5 h. Following the addition of 480 parts of butanol and the establishment of a pH of 3.5 with 50% strength sulfuric acid, distillation was carried out in circulation via a water separator for 15 h. Thereafter solvent was distilled off until a dry residue (drying at 135° C. for 1 h) of 60% was reached. The resin solution was then filtered.

2 Preparation of Binder 2

215 parts of diglycidyl ether of bisphenol A (specific epoxide group content 5.26 mol/kg; "epoxide equivalent weight" 190 g/mol), 20 parts of o-cresol and 168 parts of bisphenol A were dissolved in 100 parts of xylene and the solution was heated to 130° C. Following the addition of 0.5 part of triphenylphosphine it was stirred until the specific epoxide group content was less than 0.1 mol/kg (epoxide equivalent weight more than 10 000 g/mol). The solution was then diluted with 100 parts of butanol and admixed with 22 parts of aqueous sodium hydroxide solution (33% strength). Then at 70° C. 55 parts of aqueous formaldehyde solution (37% strength) were added and stirring was continued for 5 h. Following the addition of 480 parts of butanol and the establishment of a pH of 3.5 with 50% strength sulfuric acid, distillation was carried out in circulation via a water separator for 15 h. Thereafter solvent was distilled off until a dry residue (drying at 135° C. for 1 h) of 60% was reached. The resin solution was then filtered.

3 Preparation of Binder 3

215 parts of diglycidyl ether of bisphenol A (specific epoxide group content 5.26 mol/kg; "epoxide equivalent weight" 190 g/mol) and 168 parts of bisphenol A were dissolved in 100 parts of xylene and the solution was heated to 130° C. Following the addition of 0.5 part of triphenylphosphine it was stirred until the specific epoxide group content was less than 0.1 mol/kg (epoxide equivalent weight more than 10 000 g/mol). The solution was then diluted with 100 parts of butanol, admixed with 30 parts of a 60% strength solution of a phenol novolak (weight-average molar mass $M_w$ 750 g/mol) and with 22 parts of aqueous sodium hydroxide solution (33% strength). Then at 70° C. 55 parts of aqueous formaldehyde solution (37% strength) were added and stirring was continued for 5 h. Following the addition of 480 parts of butanol and the establishment of a pH of 3.5 with 50% strength sulfuric acid, distillation was carried out in circulation via a water separator for 15 h. Thereafter solvent was distilled off until a dry residue (drying at 135° C. for 1 h) of 60% was reached. The resin solution was then filtered.

4 Preparation of Binder 4

215 parts of diglycidyl ether of bisphenol A (specific epoxide group content 5.26 mol/kg; "epoxide equivalent weight" 190 g/mol) and 148 parts of bisphenol A were dissolved in 100 parts of xylene, and the solution was admixed with 30 parts of a 60% strength solution of a phenol novolak (weight-average molar mass $M_w$ 750 g/mol) and heated to 130° C. Following the addition of 1 part of triphenylphosphine it was stirred until the specific epoxide group content was less than 0.1 mol/kg (epoxide equivalent weight more than 10 000 g/mol). The solution was then diluted with 100 parts of butanol and admixed with 22 parts of aqueous sodium hydroxide solution (33% strength). Then at 70° C. 55 parts of aqueous formaldehyde solution (37% strength) were added and stirring was continued for 5 h. Following the addition of 480 parts of butanol and the establishment of a pH of 3.5 with 50% strength sulfuric acid, distillation was carried out in circulation via a water separator for 15 h. Thereafter solvent was distilled off until a dry residue (drying at 135° C. for 1 h) of 60% was reached. The resin solution was then filtered.

II Coatings Testing

Preparation and Testing of the Coating Materials

The binders under test were adjusted with methoxypropanol to an efflux time to DIN 53211 (4 mm outflow aperture; 23° C.) of from 40 to 60 s. This gave mass fractions of solids of from 40 to 45%. Apart from this dilution process, the resins remained unmodified.

The resulting solutions (clearcoat materials) were applied as a 25 μm wet film to standard commercial tinplate using a spiral-wound wire doctor and the films were baked in a forced-air oven at 180° C. or 200° C. for 12 minutes. After the baking process the average application of coating material was 5 g/m². The physical tests were conducted on the cooled coated panels.

The formulas are summarized in table 1:

TABLE 1

| Formulas (masses in g) | | | | | |
|---|---|---|---|---|---|
| Coating number | 1 | 2 | 3 | 4 | 5 |
| Binder from example | 1 | 2 | 3 | 4 | # |
| Mass of binder in g | 100.00 | 100.00 | 100.00 | 100.00 | 100.00 |
| Mass of methoxypropanol in g | 6.00 | 6.00 | 6.00 | 6.00 | 6.00 | comparative binder: o-cresol resole condensed with epoxy resin type 7, mass ratio 30:70

TABLE 2

| Tests and results | | | | | |
|---|---|---|---|---|---|
| | Coating 1 | Coating 2 | Coating 3 | Coating 4 | Coating 5 |
| a) Baking conditions: 12 min at 180° C. | | | | | |
| Hue | dark yellow | dark yellow | dark yellow | dark yellow | dark brown |
| Acetone test* | 100 | 100 | 100 | 100 | 40 |
| Leveling, visual** | 1 | 1 | 1 | 1 | 4 |
| Gt*** | 1 | 1 | 1 | 1 | 5 |
| b) Baking conditions: 12 min at 200° C. | | | | | |
| dark yellow | | dark yellow | dark yellow | dark yellow | dark brown |
| Acetone test* | 100 | 100 | 100 | 100 | 60 |
| Leveling, visual** | 1 | 1 | 1 | 1 | 4 |
| Gt*** | 1 | 1 | 1 | 1 | 3 |

*Acetone test: and acetone-soaked cotton pad is placed under a load of 1000 g and moved in double rubs over the coated surface; the result is reported as the number of double rubs where the coating remains unimpaired
**evaluation: 1-smooth, uniform, to 5-irregular, uneven
***cross-cut, determined in accordance with ISO 2409

For key see above

Not only color after baking but also the technical coatings properties are significantly more favorable in the case of the binders according to the present invention than in the case of the prior art systems.

The coating materials of the invention possess a greater reactivity than the standard system, as evident not least from the acetone test: whereas the coating materials of the invention are acetone-resistant at a baking temperature of just 180° C., the standard systems only attain this quality at baking temperatures of more than 200° C.

What is claimed is:

1. Condensation products of dihydroxyaromatics A with polyepoxides B where the polyepoxides B are selected from the group consisting of polyglycidyl ethers of polyhydric alcohols with a specific epoxide group content of from 0.5 mol/kg to 6.7 mol/kg, which condensation products have been alkylolated by reaction with aldehydes D, wherein the amount of substance of phenolic OH groups in A to the amount of substance of epoxide groups in B is greater than 1 mol/mol, and wherein at least some of the alkylol groups introduced by reaction with the aldehydes D have been etherified with alcohols E.

2. Condensation products as claimed in claim 1, wherein at least some of the alkylol groups introduced by the reaction with the aldehydes D have been etherified with alcohols E which alcohols are selected from the group consisting of methanol, n-butanol, and iso-butanol.

3. Binders obtained by condensation, in the first step, of dihydroxyaromatics A with polyepoxides B selected from the group consisting of polyglycidyl ethers of polyhydric alcohols with a specific epoxide group content of from 0.5 mol/kg to 6.7 mol/kg, in a ratio of the amount of substance of phenolic OH groups in A to the amount of substance of epoxide groups in B of greater than 1 mol/mol to form a condensation product, alkylolation of the said condensation product by reaction with aldehydes D in the second step, such that the reaction product formed contains free alkylol groups, wherein the amount of substance of aldehyde D to the sum of the amounts of substance of terminal phenolic OH groups in the condensation product of the first step is from 1 mol/mol to 3 mol/mol, and reaction in the third step with alcohols E to yield alkylol ethers.

* * * * *